United States Patent Office 3,103,603
Patented Sept. 10, 1963

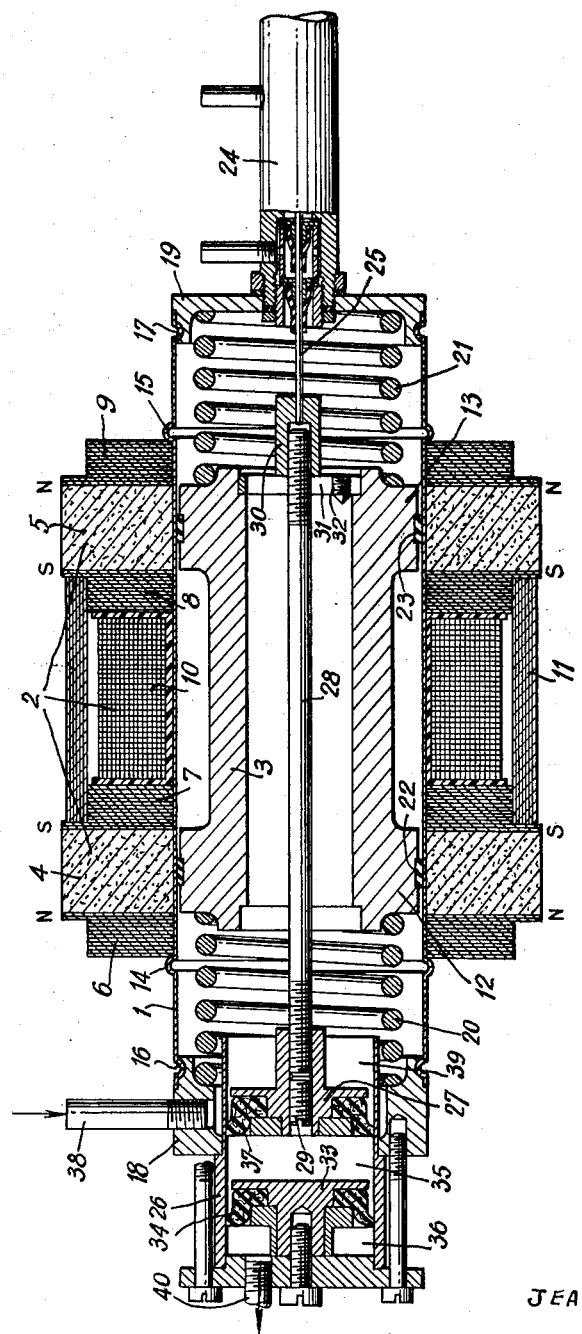

3,103,603
ALTERNATING CURRENT SYNCHRONOUS
RECIPROCATING MOTOR UNIT
Jean Léon Reutter, Villa Atmos 43, Rte. de Thanon,
Vesenaz, Switzerland
Filed Mar. 10, 1961, Ser. No. 94,793
Claims priority, application Switzerland Nov. 2, 1960
2 Claims. (Cl. 310—30)

The present invention has for object an oscillating synchronous electro-magnetic motor, comprising an axially movable armature inside a field magnet fed with alternating current, and subjected to the action of elastic drawback forces.

The motor according to the invention is characterized in that the field magnet includes two annular magnets made of ferrite, having axial magnetization and between which is co-axially disposed the energizing coil fed with alternating current, the polarity of the magnets being symmetrical with respect to the transverse median plane, so that the flux reverses in the above mentioned armature when it moves from one side to the other of the transverse median plane.

The single FIGURE of the accompanying drawing shows, by way of example, an embodiment of the motor object of the invention, seen in axial section.

At 1 is seen a tube on which is mounted a field magnet 2 which will be described in detail, while inside the same is disposed an axially movable armature 3.

The field magnet includes two annular magnets 4, 5, made of ferrite, the polarities of which are, as shown in the drawing, symmetrical relative to the median transverse plane of the unit. On either side of each of these magnets is a pole piece 6, 7 or 8, 9 each constituted by a batch of soft iron annular plates. Between the batches of plates 7 and 8 is disposed a coil 10, fed with alternating current. A batch of cylindrical plates 11 is disposed, as is seen in the drawing, around the coil 10, between the magnets 4 and 5.

The armature 3 is of a general hollow cylindrical shape and is provided, at each end, with a cylindrical bulge 12, 13 forming a pole-piece. These two pole pieces are each opposite one of the magnets 4, 5 when the armature 3 is in its mean position, which is the one shown in the drawing.

The tube 1 is of non magnetic metal, having a high electrical resistivity, preferably of stainless steel. It is provided with two circular ribs 14, 15, axially immobilizing the fixed part of the motor on this tube. These ribs 14, 15 are made after the magnets 4, 5 and the batches of plates 6, 7, 8, 9 as well as the coil 10 have been placed on the tube.

At each of its ends, the tube 1 is fixed, by a setting 16, or 17, to a flange 18, or 19. A return spring 20, bearing on the flange 18, acts constantly on the armature 3, towards the right in the drawing. Similarly, a return spring 21, bearing on the flange 19, acts constantly on the armature 3, towards the left of the drawing.

The armature 3, together with the return springs 20, 21, constitute an oscillating device the natural frequency of which is equal to that of the current feeding the coil 10 of the field magnet.

It will be understood that, when the coil 10 is fed, the armature 3 begins to oscillate on either side of its mean position in synchronism with the frequency of the current. Indeed, each time that the armature moves from one side to the other of the transverse median plane of the unit, the magnetic flux reverses inside the same.

In order to facilitate the movement of the armature 3 inside the tube 1, while ensuring its guiding in this tube, there is provided, on each of the parts 12, 13 of the armature, a ring 22, 23, for example of "Teflon."

In the example shown in the drawing, the motor described actuates a fuel oil pump and an air-pump, both serving to feed a fuel oil burner. It is obvious that the invention is not limited to such an application.

The fuel oil pump 24 is fixed in a water-proof but removable manner on the flange 19. At 25 is seen the rod of its piston which is integral, as will be indicated hereafter, with the armature 3.

The air-pump 26 is fixed in a water-proof but removable manner to the flange 18. Its piston 27 is also integral, as will be indicated hereafter, with the armature 3.

It will thus be seen that the armature 3, as well as the movable members of the pumps 24 and 26, are disposed inside a water-proof casing formed by the tube 1, the flanges 18 and 19 and the body of the pumps 24 and 26.

The attachment of the pistons 27 and of the piston rod 25 to the armature 3 is effected in the following manner:

The piston 27 is screwed on a threaded end of an axial rod 28. A safety nut 29 ensures the immobilization. At its other end, also threaded, the rod 28 is screwed in an element 30, integral with an expansible element 31 which, due to a screw 32, is made integral with the armature 3. The left-hand end of the drawing of the piston rod 25 is also fixed by screwing to the element 30.

The air-pump 26 includes a bottom 33 provided with an elastic annular lining 34 of plastic material. When the pressure, in the chamber 35 situated between the bottom 33 and the piston 27, exceeds a certain predetermined value, the lining 34 gives way and allows the compressed air to reach the outlet chamber 36. As soon as the pressure at 35 falls below this value, the lining 34 automatically interrupts the communication between 35 and 36. The piston 27 is itself also provided with a lining 37, exactly similar to 34, which allows the air penetrating inside the tube 1 by the inlet duct 38, to pass inside the chamber 35, when the pressure at 35 is lower than the pressure of the air on the other side of the piston, that is to say at 39. At 40 is the outlet duct of the air-pump.

What I claim is:

1. Alternating current synchronous reciprocating motor unit, with a transverse median plane of symmetry, comprising two annular ferrite magnets having axial magnetization, an energizing coil fed with alternating current, four sets of annular soft-iron plates constituting two pairs of pole pieces, a plurality of coaxial cylindrical plates constituting a magnetic yoke, a cylindrical tube of non-magnetic material, an armature of substantially cylindrical shape having a cylindrical bulge at each of its ends, two means for elastically drawing back said armature, a first pole piece of said pole pieces, a first annular magnet of said annular magnets, a second pole piece of said pole pieces, and energizing coil, a third pole piece of said pole pieces, a second annular magnet of said annular magnets, and the fourth pole piece of said pole pieces being arranged in the above sequence with each adjacent to the following and coaxially aligned on said tube, the transverse median plane of symmetry going transversely through the middle of said coil, said two annular magnets being arranged so that their polarity is symmetrical relative to said plane, said yoke coaxially surrounding said coil with the two pole pieces adjacent to said coil, said armature being mounted inside said tube for lengthwise reciprocation, the outer diameter of said bulges being close to the inner diameter of said tube, each of said bulges being opposite one of said magnets when said armature is in the middle position, the magnetic flux in said armature reversing when the middle of the latter moves from one side of said plane to the other, and each of said two means for elastically drawing back said armature being mounted against one end of said armature to push the latter elastically to its middle position.

2. A motor unit according to claim 1, further comprising two circular ribs projecting from said tube, one of said ribs being adjacent to the outside of said first pole piece and the other of said ribs being adjacent to the outside of said fourth pole piece, to hold firmly together said four pole pieces, said two annular magnets, said coil and said yoke.

References Cited in the file of this patent

UNITED STATES PATENTS

| | | |
|---|---|---|
| 469,441 | Wightman | Feb. 23, 1892 |
| 519,662 | Carpenter | May 8, 1894 |
| 2,459,510 | Ellman | Jan. 18, 1949 |
| 2,560,444 | Jackson | July 10, 1951 |
| 2,632,791 | Side | Mar. 24, 1953 |
| 2,708,245 | Werner | May 10, 1955 |

FOREIGN PATENTS

| | | |
|---|---|---|
| 845,676 | Germany | Aug. 4, 1952 |
| 1,003,334 | Germany | Feb. 28, 1957 |